J. J. CHARLEY.
VEHICLE GEARING.
APPLICATION FILED APR. 13, 1909.
967,728.
Patented Aug. 16, 1910.
3 SHEETS—SHEET 1.
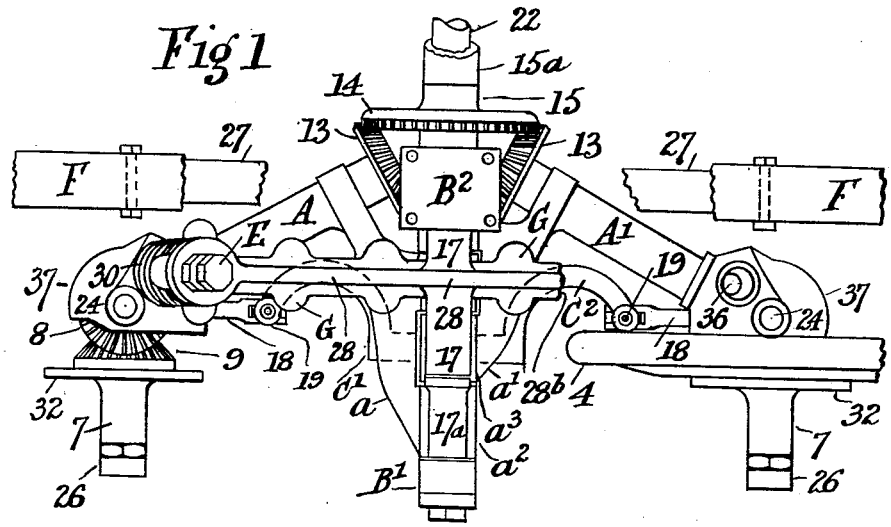
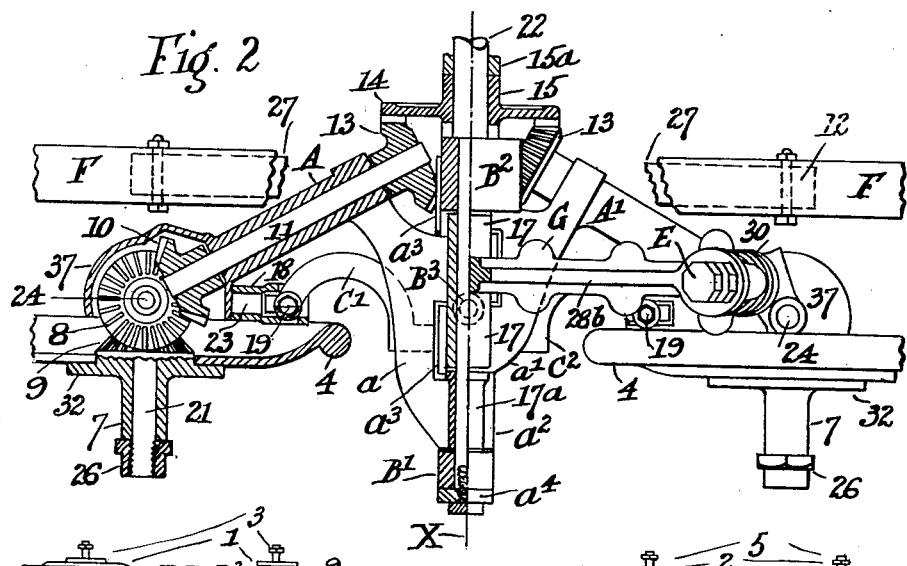
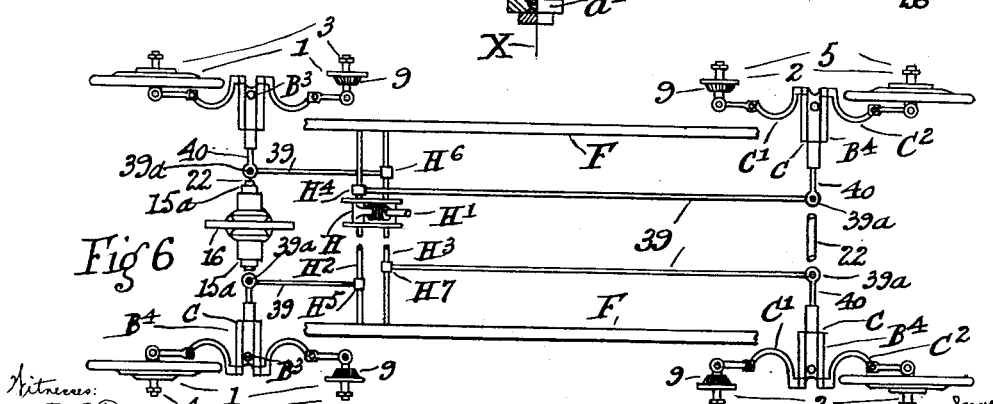

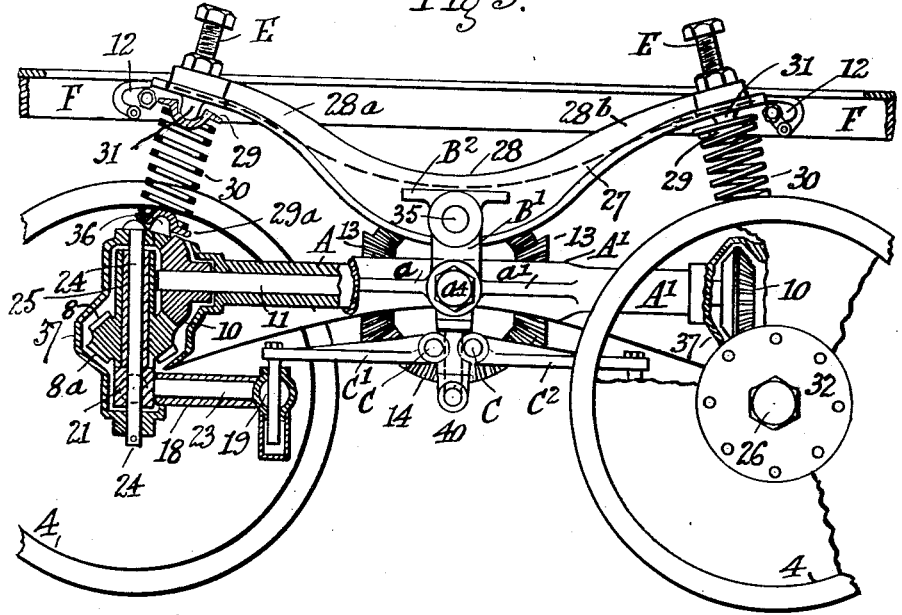
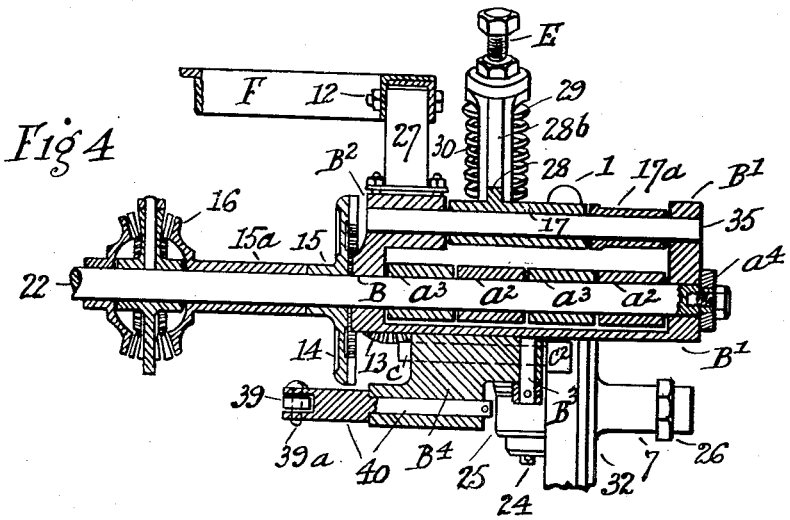
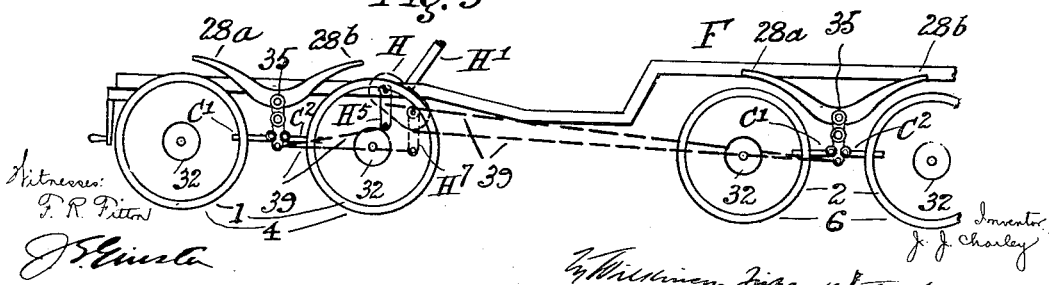

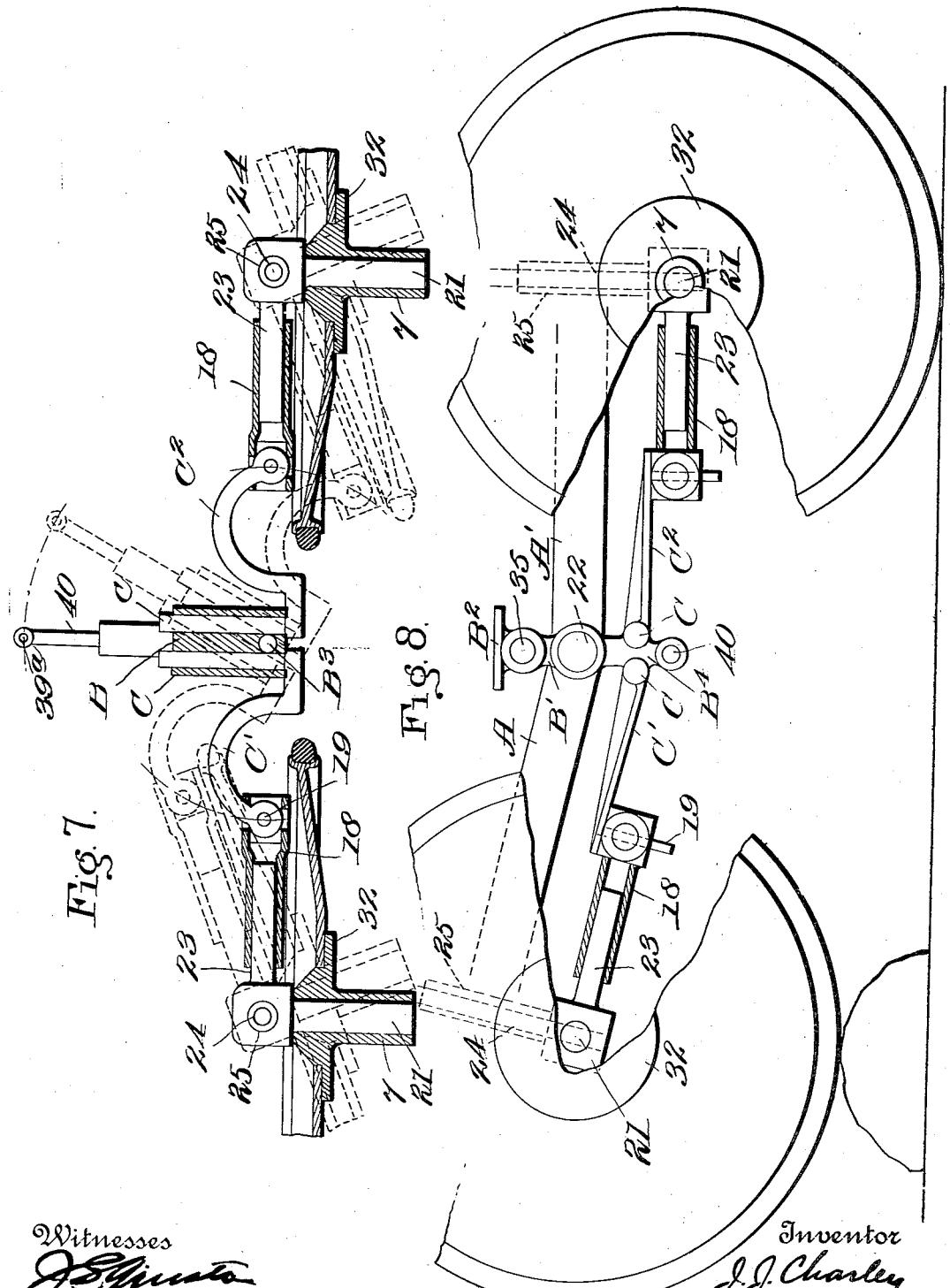

UNITED STATES PATENT OFFICE.

JOHN JOSEPH CHARLEY, OF KEW, VICTORIA, AUSTRALIA.

VEHICLE-GEARING.

967,728.

Specification of Letters Patent. Patented Aug. 16, 1910.

Application filed April 13, 1909. Serial No. 489,737.

*To all whom it may concern:*

Be it known that I, JOHN JOSEPH CHARLEY, a subject of the King of Great Britain and Ireland, &c., residing at Kew, in the State of Victoria, Commonwealth of Australia, have invented certain new and useful Improvements in Vehicle-Gearing; and I do hereby declare the following to be a full, clear, and exact description of the invention, such as will enable others skilled in the art to which it appertains to make and use the same.

This invention is very suitable for heavy passenger and freight traffic; for rough roads, cross-country journeys, and travel over comparatively loose ground, over which ordinary automobiles would not pass.

The invention relates to improvements in running gear of motor road vehicles including traction engines, automobiles, and so forth, rendering the use of pneumatic tires unnecessary, and improving their adhesion on the road, and consequently their tractive power. By its application of resilient devices between the road wheels and the chassis frame or body, it reduces vibration and shocks, and thus lessens maintenance charges, while allowing scope for the adoption of larger wheels than are practicable when pneumatic tires are used.

Instead of a four wheeled running gear, there are four pairs, each in tandem, that is eight wheels, each of which may receive power from an engine, or one of a set of engines. Thus two transverse shafts may each be supplied with compensating or differential gear, transmitting power to the road wheels, there being any suitable change speed gear which will be driven by the engine or power provided. Or four wheels are engine driven, and the other wheels are free. When one set of engines is employed the differential gearing may by any suitable means, as chain, belt, or toothed gearing, be connected to drive axles of the car as required. Comparatively light vehicles, or those that will not encounter extreme conditions of load, may have either the front or the rear set of four wheels of my construction engine driven, without using positive driving connection with the other set of four wheels.

The destructive shocks apt to be experienced when motoring on uneven roads are minimized by my construction, which includes for each tandem pair of road wheels a rocker with arms against the ends of which springs abut, between the arm ends and pivoted arms, each of which carries a driving shaft which turns a road wheel. The weights of the frame and vehicle load are distributed thus on four rockers and four pairs of springs, in addition to the body springs when the latter are used.

For steering purposes I provide devices which enable sharp curves to be turned in safety, and rapidly. To each road wheel I provide connections which allow each said wheel its appropriate turning movements. When the car is to travel in a curve and the front four wheels turn to the left, for example, the rear four will turn to the right in order to travel in the curve accordingly. The two fore wheels of the front four, also the two hind wheels of the rear four, may be caused to suitably change their planes relatively to the other two wheels of each set of four wheels, when the car is changing its direction. This steering is effected (and skidding is reduced) by the use of levers, one to each road wheel, as more fully described hereinafter.

By the aid of the accompanying drawings the above and other features of the invention will be explained in detail; but there may obviously be some variations in the number, the proportions, and the designs of parts within the scope of my devices.

Figures 1 and 2 are plans showing chiefly tandem wheels and adjacent parts, a portion of Fig. 2 being in horizontal section. Fig. 3 is a side elevation partly in vertical section showing also tandem wheels and adjacent parts. Fig. 4 is an elevation in transverse vertical section on line X Fig. 2. Figs. 5 and 6 are diagrams in side elevation and plan view, respectively, to illustrate steering devices, most other parts of the mechanism being omitted from these views. Fig. 7 is a detached detail plan view of the steering levers, showing the normal position of the levers in full lines, and in dotted lines showing the position the parts assume in steering, and Fig. 8 is a detail view in side elevation, partly broken away and partly in section, showing the independent vertical movement of any one wheel relatively to another.

In various views some parts of the mechanism are omitted to show other parts clearly.

The chassis frame F has any suitable form and is supported by body springs as 27 either at their ends 12, one spring to each tandem pair of road wheels, or otherwise. Thus body springs, of double elliptical form would, if used, support the frame on their upper middle parts. 1 represents the position of the front set of four road wheels,—see Fig. 6; 2 the position of the rear set of four road wheels; 3, 4, 5, and 6 the position of the respective tandem pairs of these wheels. Each said wheel is mounted by being bolted or connected at its hub to a flange 32 having an outer sleeve 7 with any suitable nut or the like 26. Each sleeve incloses a short axle 21 hereinafter described.

Integral with each flange 32 is an inner beveled gear wheel 9,—see Figs. 1 and 6 where various road wheels are omitted; with this gear wheel the lower part $8^a$ of a double bevel gear wheel engages; the upper part 8 is driven by a gear wheel 10 keyed to a shaft 11 working in a hollow arm. The arm for the front wheel of each tandem pair is marked A, and that at the rear of each tandem arrangement $A^1$. These arms support the shafts 11, and each arm carries also a gear wheel 13, which engages a toothed beveled wheel 14, the sleeve or hub 15 of which is coupled to a sleeve $15^a$, on which is any suitable differential gear 16, which works on a shaft 22 which passes through hub 15. Shaft 22 also passes through a suitable recess in a specially formed casting B, having outer end $B^1$ over which, at the end of shaft 22 is any suitable collar or fastening as at $a^4$. Shaft 22 extends across the chassis or frame, and takes the place of the axle ordinarily used. It will now be evident that causation of rotation of sleeves $15^a$ drives also all the front tandem wheels at 1, and when required all rear wheels at 2 are also similarly driven.

Parts A and $A^1$ are each a portion of a bracket. These brackets are marked $a$, $a^1$, and are supported by main shaft 22 passing through eyes $a^2$ of bracket $a$ and $a^3$ of bracket $a^1$, the brackets thus being pivoted on said shaft so that arms A, $A^1$, will yield or swing each independently in response to road inequalities. See Fig. 8.

Each body spring 27 when of the kind shown, bears on a part as seat $B^2$, of casting B. The latter is perforated to support the ends of a shaft 35, Figs. 3, 4 and 8, which passes through a sleeve 17 and so pivotally supports a rocking member 28 which has said sleeve 17, and $17^a$ is any suitable distance sleeve on shaft 35. Member 28 has two arms, $28^a$, $28^b$, extending longitudinally. These arms have at their outer ends, nipples or bosses at 31 (shown in Fig. 3 as ends of adjustable screws E), resting on or in recesses of, suitable seatings, sockets, plates, or caps 29, which act as abutments for shock absorbing springs 30. In the figures the road wheels appear as solid disks with parts broken out or omitted. The lower parts of springs 30 abut on similar plates or seatings $29^a$, which bear on suitable nipples or bosses 36 on any suitable support as a dust case 37, provided at the end of each of the sleeves A, and $A^1$. To enable road wheel mud guards (not shown) to be attached in suitable positions, lugs G are shown in Figs. 1 and 2 on rocker 28. It will now be seen that any shock to or bump, however severe, of a road wheel, causing it to rise suddenly owing to road irregularity, will be absorbed in part, by the nearest spring 30, while the nearest rocker 28 will also by its resiliency or swing cause absorption of part of the shock of the adjacent spring 30, the shock transmitted to the frame itself being as the net result comparatively slight, even when as in some cases, all or some of the body springs as 27 are omitted. While rockers 28 for some cars will themselves be made springy, for others they will be of rigid material.

Referring now to the arrangement for steering, Figs. 5 and 6 should be consulted as well as some of the others. There is any suitable steering spindle $H^1$ which by worm or other gearing operates toothed sectors or segments in a suitable casing H, on transverse shafts $H^2$, $H^3$, which by four crank arms $H^4$, $H^5$, $H^6$, $H^7$, respectively are connected to four connecting rods 39 which are each pivoted at $39^a$ to a pin 40, Figs. 6 and 4, in the latter of which the pin is in part shown in section. This pin passes through a casting $B^4$ which supports it.

$B^3$ is a bolt projecting downward from casting B, and supporting pivotally the casting $B^4$ which can thus swing horizontally forward and rearward on said pivot. Casting $B^4$ is perforated or the like to receive two transverse spindles C, each spindle being at the end of a steering lever, the front one marked $C^1$ for the front wheel of each tandem pair, and the rear lever $C^2$ for the rear wheel. There are connections from arms $C^1$, $C^2$, to the road wheels as will be understood from Figs. 3 and 7 where 19 is a hinge joint having a sleeve 18 adapted to slidably receive the shaft or rod 23, connected at its outer end to the short axle 21 of a road wheel, similar means being provided for the other wheels.

Shaft 23 is a horizontal projection at right angles to the short axle 21,—Figs. 2 and 3,—which is supported within sleeve 7 of the road wheel, and integral with the same axle is a vertical tubular standard or sleeve 25 adapted to turn on which is wheel 8, 8$^a$. 24 is a pivot bolt through sleeve 25. Thus parts 23, 21, and 25 are integral, and can swing on bolt 24, a dust casing 37 inclosing parts 24 and 25.

It will now be seen that not only will action of shaft H$^1$ give positive movement to each road wheel by reason of the connections, joints, and pivots set forth, but that each road wheel is nevertheless able to yield or rise on meeting with a road inequality.

It is to be understood that in some cases such parts of my construction as will serve desired purposes may be used without using the whole.

By reason of the pivotal arrangements described no shocks given to any one of the road wheels by track inequalities can be fully transmitted to the frame F.

The pivoting of parts A A$^1$ by their brackets or connections at a point intermediate of the tandem wheels insures that any shock to one of these wheels causing it to rise shall be at once mitigated; it does not pass in full to the other wheel of the tandem pair because any one shaft 11 can move pivotally independently of its neighboring shaft. The rocker further breaks the vibration or shock and then there is such further break as the body spring produces before frame F is affected.

The jolts and vibrations of road travel vary considerably, some being much less violent and sudden than others. With the less violent changes the combination of the tandem wheels in Fig. 3, the rocker, the springs 30, and arms A A$^1$ may have an oscillating or see-saw motion on the pivots 35, and 22 practically as if a solid body were so pivoted.

It will be obvious that parts of my device which deaden road shocks and lessen vibration of the frame, are usable without the driving mechanism or toothed gearing described; as the vehicle may be drawn along by another. It is obvious that the increase of road adhesion, by reason of the large number of road wheels used, is gained by simple means, without great increase of weight.

What I claim as my invention and desire to secure by Letters Patent of the United States is:—

1. In running gear for wheeled vehicles, the combination of vertically movable wheel-supporting members and means for controlling their upward movement, wheels pivotally mounted on said wheel-supporting members to swing laterally thereof, and levers mounted to swing vertically and in- directly connected to said wheels, substantially as described.

2. In a running gear for wheeled vehicles, the combination of a framework, lever members connected to said framework and mounted to swing laterally and vertically, a vertical shaft connected to the free end of each of said lever members, short lateral axles connected to said vertical shafts, wheels on said short axles, means controlling the vertical swing of said lever members, and steering connections controlling their lateral swing, substantially as described.

3. In a running gear for wheeled vehicles, the combination of a framework, an extensible lever member at each side of said framework and mounted to swing vertically and laterally, said lever members being provided at their free ends with vertical shafts, short axles connected to said vertical shafts, steering wheels on said short axles, traction wheels carried by said framework and mounted to move vertically in their planes, means controlling the vertical swing of said lever members and the vertical movement of said traction wheels, steering connections controlling the pivotal swing laterally of said steering wheels, and driving means connected to said steering wheels, whereby said steering wheels also function as driving wheels and are free to move in vertical planes and swing laterally on the line of their vertical axes, substantially as described.

4. In running gear for wheeled vehicles, the combination of vertically movable wheel-supporting members and means for controlling their upward movement, a vertical sleeve carried by each of said wheel-supporting members and provided at its lower end with a short projecting lateral axle and a horizontal projecting rod, a vertical rod carried by each of said wheel-supporting members extending through said vertical sleeve and forming an axis around which said short axle and horizontal rod rotate, a sleeve telescoping on each of said horizontal rods, road wheels, a plurality of which are mounted on said short axles, a plurality of levers mounted to swing vertically and laterally, steering connections controlling the lateral swinging of said levers and hinged connections between the free ends of said levers and said horizontal sleeves, substantially as described.

5. In running gear for wheeled vehicles, the combination of horizontally swinging castings, steering rods connected to said castings, a steering lever pivotally mounted on each of said castings to swing in a vertical direction, a sleeve connected with each of said levers by a hinge joint, a rod slidably mounted in each of said sleeves, vertically movable wheel-supporting members, road wheels, a plurality of which are pivotally connected to said wheel-supporting members and are operable laterally by said slidable rods, and means exerting downward pressure on said road wheels to control their vertical movement, substantially as described.

6. In running gear for wheeled vehicles, the combination of a shaft extending across the frame of the vehicle, supporting means mounted on said shaft, castings carried by said supporting means and pivoted to swing in a horizontal direction, steering rods connected with the inner ends of said castings, vertically swinging levers pivoted to said castings, vertically movable wheel-supporting members and road wheels pivotally mounted thereon to swing laterally, extensible means operatively associated with said road wheels to swing same laterally, a hinge joint connecting said extensible means and levers, and means exerting downward pressure on said road wheels to control the upward vertical movement, substantially as described.

7. In running gear for wheeled vehicles, the combination of a shaft extending across the framework, supporting means mounted on said shaft, castings pivoted on said supporting means to swing in a horizontal plane, steering rods connected with said castings, levers pivotally connected to said castings to swing in a vertical plane, hollow shafting rotatably mounted on said shaft, driving means for said hollow shafting, vertically movable supporting members, road wheels pivotally mounted on said supporting members to swing laterally, gearing interposed between said shafting and one or more of said wheels, means exerting downward pressure on said wheels to control their upward vertical movement, and extensible means disposed between said road wheels and said levers for swinging said wheels laterally, a hinge joint connecting said levers with said extensible means, substantially as described.

8. In running gear for wheeled vehicles, the combination of a pair of trucks, a pair of castings for each of said trucks mounted to swing in a horizontal direction, levers pivoted to said castings and mounted to swing in a vertical direction, vertically movable wheel-supporting members extending forwardly and rearwardly at each side of the truck, road wheels pivotally supported thereby, extensible means connected to the free ends of said levers and operatively associated with the respective front and rear wheels of said trucks for swinging said wheels laterally, said extensible means containing a hinge joint as an element, means for exerting a downward pressure on said wheels to control their vertical movement, and steering rods connected with said castings, substantially as described.

9. In running gear for wheeled vehicles, the combination of a truck provided with road wheels having gear wheels attached thereto, a pair of swinging brackets carried by said truck at each side thereof and extending inwardly in a diverging direction, hollow sleeves supported by said swinging brackets and terminating in a gear casing, said road wheels being pivotally supported by said casing to swing laterally, means exerting downward pressure on said road wheels to control their upward movement, steering means operatively associated with said road wheels to control their lateral swing, driving gears, shafts journaled in said hollow sleeves, double bevel gear wheels in said casing, having one set of teeth meshing with the wheel gears, and gear wheels carried by said shafts meshing with the other set of teeth on said double bevel gear wheels, and further gear wheels on said shafts meshing with said driving gears, substantially as described.

10. In running gear for wheeled vehicles, the combination of a truck, road wheels, connecting means between said truck and road wheels permitting said wheels to move vertically independently of each other, a rocker member on each side of said truck pivoted centrally on said truck and having arms extending substantially above the pair of wheels on that side of said truck, and springs disposed between said rocker arms and said wheels for controlling their vertical movement, substantially as described.

11. In running gear for wheeled vehicles, the combination of a truck provided with a pair of tandem wheels at each side thereof, vertically movable members for each of said wheels, a pair of said wheels being pivotally mounted on said vertically movable members to swing laterally, a shaft extending across said truck intermediate of said wheels, rocker members at each side of said truck pivotally supported centrally by said shaft, said rocker members having arms extending forwardly and rearwardly and terminating substantially above the forward and rear wheels of each tandem pair, coiled springs interposed between said rocker arms and vertically movable supports and steering connections for said pivoted wheels, substantially as described.

12. In running gear for wheeled vehicles containing as an element, a truck provided with front and rear tandem wheels at each side thereof each wheel being mounted on a vertical axis to swing laterally, a shaft extending across said truck intermediate of said wheels, castings or blocks pivotally suspended from said shaft and swinging in a horizontal plane, steering rods connected to said castings, vertically swinging levers pivoted to said castings, connections between the free ends of said levers and said laterally swinging wheels, said connections being provided with a hinge joint, a rocker member pivotally supported on said shaft and provided with arms extending above said wheels, and coiled springs disposed between said arms and the supports for said wheels, substantially as described.

In witness whereof I have hereunto set my hand in the presence of two witnesses.

JOHN JOSEPH CHARLEY.

Witnesses:
GEORGE G. TURRI,
BEATRICE M. LOWE.